United States Patent [19]

John

[11] Patent Number: 5,179,373
[45] Date of Patent: Jan. 12, 1993

[54] INFORMATION NETWORK

[75] Inventor: Philip B. John, Basingstoke, Great Britain

[73] Assignee: Motorola, Inc., Schaumburg, Ill.

[21] Appl. No.: 604,724

[22] Filed: Oct. 26, 1990

[30] Foreign Application Priority Data

Oct. 26, 1989 [GB] United Kingdom ............... 8924145

[51] Int. Cl.$^5$ .................... G05B 15/00; H04B 1/00
[52] U.S. Cl. .................... 340/825.15; 340/825.44; 379/63; 455/56.1
[58] Field of Search .............. 340/825.15, 825.08, 340/825.44, 825.54, 825.07; 235/382, 382.5; 379/57, 58, 59, 60, 61, 62, 63; 455/54, 58, 33.1, 33.2, 54.1, 54.2, 53.1, 56.1

[56] References Cited

U.S. PATENT DOCUMENTS

| | | | |
|---|---|---|---|
| 4,562,572 | 12/1985 | Goldman et al. ............... | 379/60 |
| 4,857,714 | 8/1989 | Sunyich .......................... | 235/382.5 |
| 4,860,379 | 8/1989 | Schoeneberger et al. ...... | 340/825.44 |
| 5,014,345 | 5/1991 | Comroe et al. .................. | 455/54 |
| 5,047,763 | 9/1991 | Kuznicki et al. ................ | 340/825.44 |

FOREIGN PATENT DOCUMENTS

| | | | |
|---|---|---|---|
| 0290725 | 11/1988 | European Pat. Off. .............. | 379/60 |
| 3921637 | 1/1991 | Fed. Rep. of Germany ........ | 379/59 |

Primary Examiner—Donald J. Yusko
Assistant Examiner—Andrew M. Hill
Attorney, Agent, or Firm—Jon P. Christensen

[57] ABSTRACT

This invention relates to an information network such as a telepoint network, having discrete communications units, such as telephone communications handsets (14), where each unit has a user-inaccessible memory. The invention also applies to networks of other units, such as smart cards. The network has regional controllers (11 and 12) for funnelling information from base stations (10) into a central controller (13). At the central controller, analysis of past communications is carried out and, based upon this, instructions are sent out to selected regional controllers for programming the memories of selected regional controllers for programming the memories of selected discrete units when those discrete units next communicate with base stations associated with the selected regional controllers.

8 Claims, 1 Drawing Sheet

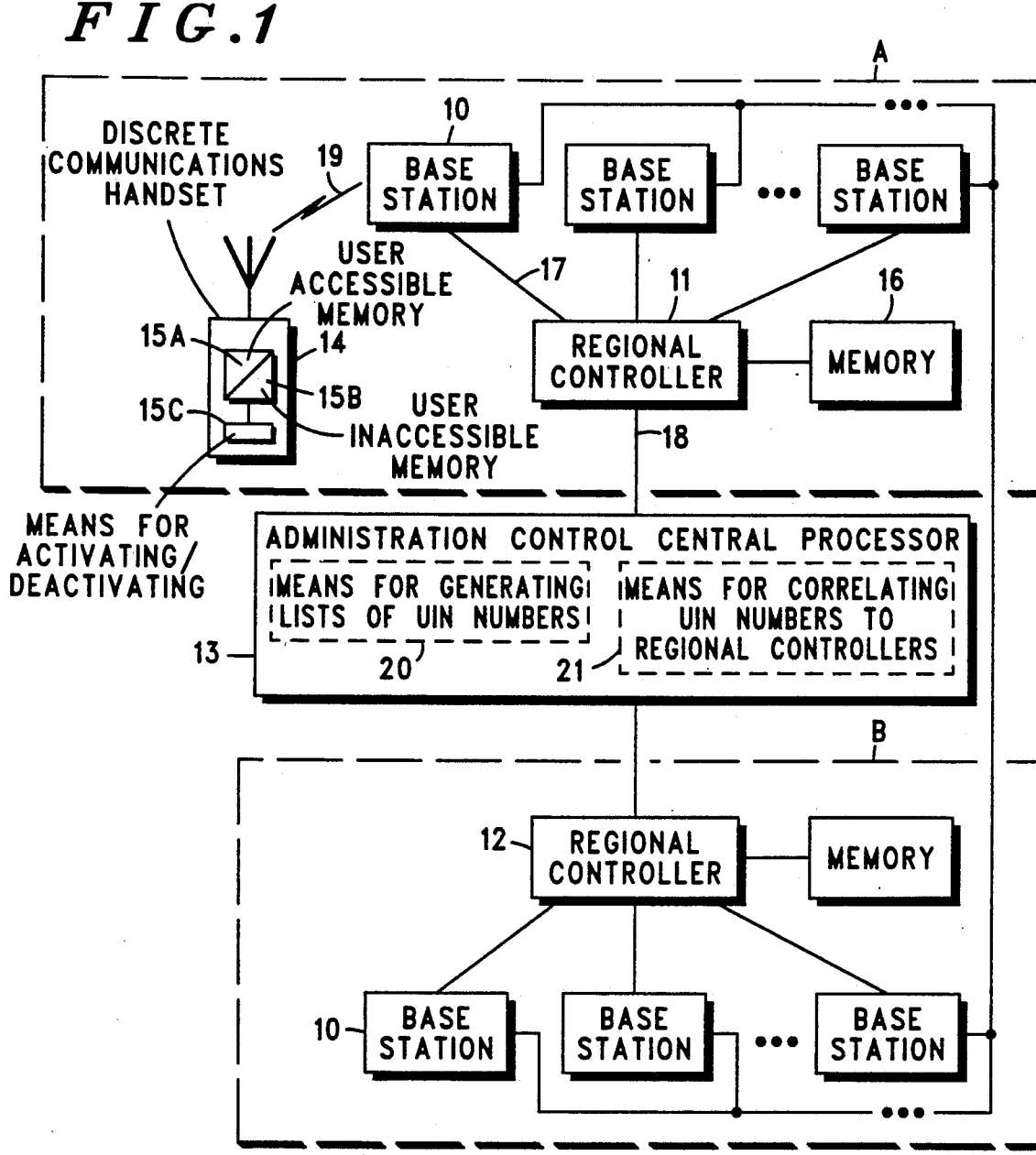

INFORMATION NETWORK

FIELD OF THE INVENTION

This invention relates to an information network which communicates with discrete communications units, such as telephone communication handsets, "smart" cards or other discrete devices having internal memory which is inaccessible by the user of that device, but is only accessible by the network itself.

BACKGROUND OF THE INVENTION

In the field of telepoint communications, i.e. cordless public telephone communications, handsets are provided which have a user programmable memory, such as for programming frequently used telephone numbers, and a user non-programmable memory, i.e. an r.f. programmable memory, which can only be programmed over the r.f. interface from a base station.

In a telepoint system, a large number of base stations are provided, distributed across wide area, e.g. across the whole of the United Kingdom. It is necessary periodically to communicate with each base station to down-load to a central controller information regarding activity at that base station, such as billing information. It has been proposed that terminal management computers are provided at regional points to provide a regional centre for down-loading of information from base stations in a region, and for the terminal management computers to in turn down-load their information to a central billing processor. Such an arrangement has the advantage of reducing telephone charges from the public switched telephone network, because it reduces the number of long distance calls required to complete a down-loading cycle.

SUMMARY OF THE INVENTION

According to the present invention, there is provided an information network comprising:
 a central controller;
 a plurality of regional controllers connected for communication with the central controller;
 a plurality of remote communications terminals divided into regions, each region comprising a plurality of such terminals served by a regional controller by being connected for communication therewith; and
 a plurality of discrete information units, each comprising a user-inaccessible memory programmable only by means of a remote terminal characterized in that:
 the central controller comprises means for generating a list of user identification numbers (U.I.N.s), each U.I.N. uniquely identifying a discrete information unit, means for correlating each U.I.N. with at least one regional controller based upon past communications between the discrete information unit and remote communications terminals in the region served by the regional controller, and means for transmitting the U.I.N.s on the list to only those regional controllers with which they are individiually correlated,
 each regional controller comprises means for storing those U.I.N.s in a regional list and means for transmitting its regional list to terminal in the region its serves and
 each remote terminal comprises means for programming a user-inaccessible memory of a discrete information unit on the regional list stored thereby when that discrete information unit next communicates with that remote terminal.

BRIEF DESCRIPTION OF THE DRAWINGS

FIG. 1 comprises a block diagram of an information system in accordance with the present invention.

DESCRIPTION OF THE PREFERRED EMBODIMENTS

Referring to FIG. 1, there is shown a telepoint network comprising a plurality (e.g. 2000) of base stations (remote terminal or remote unit) 10 located in two regions A and B in approximately equal numbers. Each region has a regional controller 11 and 12 and the whole network has a single administration and control central processor 13. The are a large number (e.g. 25,000) of discrete communications handsets 14 distributed throughout the regions A and B. A user of a handset may carry his handset from region A into region B and may use his handset in both regions, according to circumstances which are described below. Each handset 14 has a memory which is divided into a user accessible part 15A and a user inaccessible part 15B.

Each of the base stations 10 communicates with its regional controller 11 or 12 via the public switched telephone network (PSTN) using an automatic dialer in the base station (or in the regional controller). Communications between a base station and its regional controller is periodic (e.g. once a day at off-peak times). At all other times the base station is connected to the PSTN for a user of a handset to communicate into the PSTN. Of course, if a base station has more than one telephone line connected to the PSTN, then that base station can be open for communication with a handset 14 even at the time that it is communicating with its regional controller.

For an explanation of the invention, it is convenient first to consider the activity of a subscriber (i.e. a user) purchasing a handset 14.

A user purchases a handset from a registered dealer and is signed onto the system by means of a telephone conversion between the dealer and an operator of the adminstration and control central processors. The dealer quotes a seven digit unit identification number (U.I.N.) which uniquely identifies the handset and from this number the central processor 13 generates a four-digit registration number which the dealer enters into the handset. The registration number is algorithmically related to the U.I.N. and a random number. The random number can be changed periodically so the registration number has a limited lifetime. This registration number is only used for the first successful attempt by the user to access a base station 10.

When the user first accesses a base station 10 (by coming within range of the base station and activating a call), a prerecorded message is transmitted across the air interface to the user 14 saying "please enter 4-digit PIN". This message is generated by the base station itself. The user enters a 4-digit number of his own devising and the base station 10 records this PIN for future use. The previously entered 4-digit registration number provided by the dealer is now obsolete, and is replaced by the 4-digit PIN. If this initial activation sequence is not carried out within a predetermined minimum time of purchase of the handset, the originally provided number exceeds its lifetime and the user must apply for a new number.

When the user has entered his 4-digit PIN, the base station 10 programs this into the secure (user inaccessible) memory 15B via means for programming comprising the r.f. interface. By this means, it is not possible for an unauthorized user to change the PIN. In future communications, a user enters his PIN and the base station checks that this corresponds to the number programmed in the secure memory 15B.

Following the above sequence, the handset 14 is active and can immediately be used to communicate with any other base staion through a means for connecting the discrete unit 14 to a communication network comprising the r.f. interface 19.

In addition to the down-loading of information from the base stations to the administration and control central processor via the regional controllers, the present invention provides for a flow of information in the opposite direction and ultimately for the programming of the secure memory 15B of a handset from control information generated at the central processor 13. This information falls into three principal categories:
1. deactivation and reactivation of handsets (commonly referred to as zapping and unzapping);
2. programming of the new service PIN; and
3. programming of the class of service permitted for the handset in question.

Different classes of service may include, for example, national or local calls only, maximum of two hours access for a single call etc.

A list is stored in the central processor 13, called the work order, which defines actions to be taken in programming secure memories of handsets. Each entry in the list contains at least a U.I.N. of a handset and an instruction code identifying the action to be carried out. Thus, if the administration and control central processor identifies that a particular user is a bad debtor, an action can be entered on the work order to deactivate (zap) that handset when it next accesses the network.

It is a feature of the regionalization of the network that the central processor 13 can identify, from its billing procedure, that a unit 14 predominantly operates in a particular region A. It is thus necessary to transfer this particular work order instruction to, and store within, a means for storing 16 within regional controller 11 only. Since the handset is unlikely to operate in region B it is not necessary to transfer this instruction to regional controller 12. This cuts down the amount of overhead traffic in the system.

When the base station 10 next communicates with its regional controller 11, the regional controller 11 down-loads its regional work order into the base station 10 (and every other base station in turn in region A) via a means for transmitting its regional list, such as control link 17. Because the work order has been regionalized, the amount of data to be transferred to the base stations in region A is reduced, and the amount of information that needs to be stored at the base stations in region A is also reduced. Each of these features reduces the equipment cost and the operating costs of the system.

When the handset 14 next attempts to communicate through a base station in region A, its unique 7-digit registration number is matched with the same number stored in the work order at the base station and the programmed action is carried out, e.g. the handset 14 is deactivated (zapped) through a means for programming which, in the case of the handset 14, is comprised of the r.f. interface 19 the r.f. interface. Deactivation is carried out by programming into the secure memory 15B and through a means for activating/de-activating 15C operating in conjunction with secure memory 15B.

Of course, a bad debtor unit could satisfactorily operate in region B, however as soon as billing information is down-loaded from the base stations in region B to the administration control central processor 13 via regional controller 12, the central processor 13 can identify that the zap instruction must be programmed to the base stations in region B. Any liability accrued for telephone charges in the interim time is a small price to pay for the overall cost reduction in the system.

By way of further illustration of the invention, reference is made to Tables 1 and 2.

Table 1 shows an example of a customer's bill, as generated by the administration and control central processor 13. The customer's U.I.N. is 1234567. Let it be supposed that this customer fails to pay his bill in due time. The processor 13 will analyze the bill according to the base stations listed against previous calls. The base stations listed are nos. 20, 21, and 22. Let it be supposed that all these base stations are in region A. The processor 13 will add the customer's U.I.N. to its work order. This is shown in Table 2. The code "1" is an instruction to zap (deactivate). The central work order has a data field for identifying a region. The instruction outlined in bold lines is transferred to the work order of the regional controller 11 of region A. Other instructions are sent to other regional controllers. Thus the amount of data that a regional controller must pass to all the base stations in its region is reduced. The corresponding data to be stored at a base station is reduced, as is the amount of processing required each time a handset tries to initiate communication with a base station.

Reactivation of a deactivated handset is carried out in the same manner as deactivation. The instruction is sent to the regional controller(s) where that handset was last known to operate, or where it previously predominantly operated.

A decision as to which regional controller(s) an instruction is to be sent to is reached by a means for generating 20 a list of unit identification numbers (U.I.N.s) within the central controller 13 on the basis of analysis of billing instructions received from various base stations. When a base station down-loads a billing instruction to the central processor 13 via its regional controller 11 or 12, a single billing instruction containing a U.I.N. identifies the handset in question and the base station where a call was made. When an action is to be added to the work order, the distribution of previous calls on the account of that user can be examined by a means for processing. If, for example, it is found that more than 90% of previous calls made by that unit were in a single region, it can be decided within the central processor 13 by a means for correlating 21 each U.I.N. with at least one regional controller that the action instruction need only be sent to the regional controller for that region by a means for transmitting to only those regional controllers with which those instructions were individually correlated such as by control link 18.

An instruction from the work order at the central processor may be sent to more than one regional controller, for example, in the case where a handset operates in an area bordering on two adjacent regions and previous billing instructions have been received from base stations in those regions, or, for example, where the user of a handset is highly mobile and travels throughout several regions.

Another type of instruction that may be generated on the work order of the central processor is the class of service to which a particular user is permitted. The following classes of service may be provided:

1. Full dialling facilities, maximum call length 2 hours;
2. Full dialling facilities, maximum international or trunk call 2 minutes, local 2 hours;
3. Trunk and local calls only, maximum call length 2 hours;
4. Trunk and local calls only, maximum call length— trunk 2 minutes, local 2 hours;
5. Local calls only, maximum call length 2 hours;
6. Local calls only, maximum call length 2 minutes; and
7. Free and emergency calls only;

Handsets are provided with a default class preprogrammed in their secure memory 15B. This default class is class 1. If the class of service is to be reduced, e.g. where a manager wishes to restrict the call which can be made by his employees using such handsets, the instructions to reduce the class of service are added to the central work order and distributed to the appropriate regional controller(s). A change of class of service takes a day to implement, because the base stations communicate with their regional controller once a day. Reduction of call service can be made at the decision of the network operator, e.g. as a result of bad payment of debt.

When a subscriber wishes to terminate his subscription to the system, he must be de-registered. This is carried out in the same way as zapping. It is unrealistic to hold a list of de-registrations at a base station indefinitely. If an action on the work order is not carried out within a predetermined period of time, it is removed from the work order.

Each handset has a user programmable memory 15A. This can be used for storing frequently used numbers for automatic dialling, as is commonly used in hardwired telephones.

The invention has been described above in respect of a cordless public telephone network, however it is applicable to other information networks where discrete units communicate with base stations across a wide area. Such systems include automatic banking machines and cash dispensers for banks. In this case, the discrete communications unit may be a smart card i.e. a card having a microprocessor and a nonvolatile semiconductor memory. Base stations in a cash dispenser network need to communicate with the network more frequently than in the case of a telepoint network, because if a user withdraws a large sum of money from one dispenser, it may not be permissible to allow him to withdraw a large sum from another dispenser in the same day. It is thus not a problem to regionalize zapping of dispenser cards because if an unauthorized card is used in a region where the identification of that card is not stored on the work order for zapping, a single use of that card can trigger the transfer of the zap instruction to the region in which it is used. The liability that such a system gives rise to is limited to the maximum sum that can be dispensed at any cash dispenser. Other actions which may be stored on the work order of a cash dispenser network may include a class of service instruction, which may determine the maximum amount of cash that may be dispensed or may determine what other facilities are available to that card (e.g. credit transfer, issuing of bank statements, issuing of cheque books etc.).

Another system to which the invention is applicable would be a cable television system.

I claim:
1. An information network comprising:
a central controller;
a plurality of regional controllers connected for communication with the central controller;
a plurality of remote communications terminals divided into regions, each region comprising a plurality of such terminals served by a regional controller by being connected for communication therewith; and
a plurality of discrete information units, each comprising a user-inaccessible memory programmable only by means of a remote communication terminal characterized in that:
the central controller comprises means for generating a list of unit identification numbers (U.I.N.s) each U.I.N uniquely identifying a discrete information unit, means for correlating each U.I.N. with at least one regional controller based upon past communication between the discrete information unit and remote communications terminals in the region served by the regional controller, and means for transmitting the U.I.N.s on the list to only those regional controllers with which they are individually correlated,
each regional controller comprises means for storing those U.I.N.s in a regional list and means for transmitting its regional list to terminals in the region it serves and
each remote terminal comprises means for programming a user-inaccessible memory of a discrete information unit on the regional list stored thereby when that discrete information unit next communicates with that remote terminal.

2. A network according to claim 1, wherein means are provided at the discrete unit for activating or substantially deactivating the ability of that unit to carry out communications when a remote terminal writes to the user inaccessible memory of that unit.

3. A network according to claim 2, wherein the remote terminal unit is provided with means for connecting the discrete unit to a communications network and the predetermined further communications include all connecting of the discrete unit to that network.

4. A network according to claim 2, wherein the remote terminal is provided with means for connecting the discrete unit to a communication network and the predetermined further communications include all connecting of the discrete unit to that network for more than a predetermined time.

5. A network according to claim 2, wherein the remote terminal is provided with means for connecting the discrete unit to a communications network and the predetermined further communications include all connecting of the discrete unit to at least certain parts of that network.

6. A network according to any of claims 1 to 5, further comprising means for communicating U.I.N.s from the central controller to a regional controller for adding to or removing from the regional list stored at the regional controller.

7. A network according to claim 6, further comprising means for communicating information in addition to U.I.N.s from the remote terminals to the regional controllers and from the regional controllers to the central controller and means at the central controller for processing said information, generating information in response, including U.I.N.s to be added to or removed from the regional lists stored at the regional controllers and communicating said information to selected regional controllers.

8. A method of controlling the use of discrete information units in an information network comprising a central controller, a plurality of regional controllers connected for communication with the central controller and a plurality of remote communications terminals divided into regions, each region comprising a plurality of such terminals served by a regional controller by being connected for communication therewith, the method comprising the steps of:

generating a list of unit identification numbers (U.I.N.s) at the central controller, each number uniquely identifying a discrete information unit, correlating, at the central controller, each U.I.N. with at least one regional controller based upon past communications between the discrete information unit and remote communications terminals in the region served by the regional controller, transmitting the U.I.N.s on the list to only those regional controllers with which they are individually correlated, storing those U.I.N.s at the regional controllers in regional lists, transmitting the regional list stored by each regional controller to remote communication terminals in the region served thereby and storing that list at those terminals and programming a user-inaccessible memory of a discrete information unit on the regional list of a remote terminal when that discrete information unit next communicates with that remote terminal.

* * * * *